May 26, 1925.  1,539,314

M. V. C. HOWES

TEAT ENGAGING TIP

Filed Aug. 17, 1922

INVENTOR
MURRAY V.C. HOWES.
BY E.B.Birkenbeuel
HIS ATTORNEY.

Patented May 26, 1925.

1,539,314

UNITED STATES PATENT OFFICE.

MURRAY V. C. HOWES, OF PORTLAND, OREGON.

TEAT-ENGAGING TIP.

Application filed August 17, 1922. Serial No. 582,512.

*To all whom it may concern:*

Be it hereby known that I, MURRAY V. C. HOWES, a citizen of the United States, and a resident of Portland, in the county of Multnomah and State of Oregon, have invented a new and useful Teat-Engaging Tip, of which the following is a specification.

This invention relates more particularly to means for treating the udders of cows.

The object of my invention is to provide an exceedingly simple and efficient means for injecting into the udder of a cow either common air, filtered air, or medicated air, liquids or gases. A further object is to do so in a manner that no physically injury or infection can be caused thereby.

I accomplish these results in the manner set forth in the following specification and illustrated in the accompanying drawing, in which:—

Figure 1:
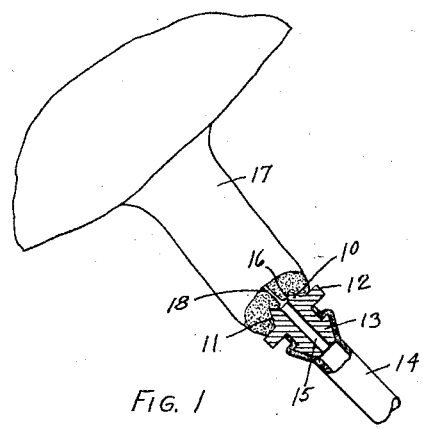
Figure 3:
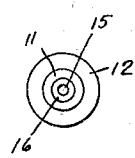
Figure 2:
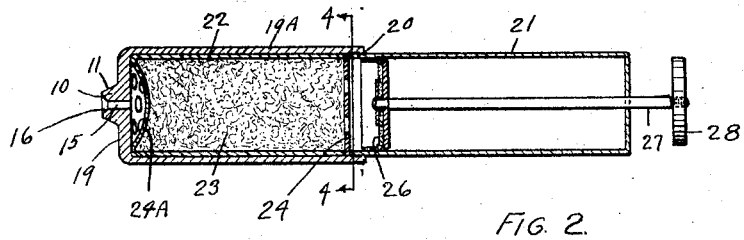
Figure 4:
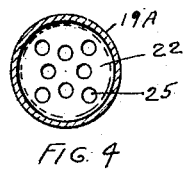

Figure 1 is a sectional view of the special teat engaging tip showing the manner in which it engages the teat. Figure 2 is a section through my device showing the manner in which the tip is used in connection with a filter pump. Figure 3 is a plan of the tip from the teat engaging side. Figure 4 is a sectional view along the line 4—4 in Figure 2.

Similar numbers of reference refer to the same or similar parts throughout the several views.

Referring in detail to the drawing, I have constructed my device of a turned piece of material having a teat engaging projection 10 whose outer side 11 tapers from the large flange 12 behind which is formed the neck 13 for attaching the usual hose 14. A discharge hole 15 passes through the length of the tip and the outer end 16 of this hole is countersunk. In Figure 1, the tip is shown engaging the teat 17. The object of the countersinking of the hole 15 becomes plain in this view since it facilitates the registering of the hole 15 with the passage 18 in the teat 17. The flange 12 limits the distance that the tip can enter the teat and at the same time forms an additional seat for confining the pressure from the tip.

In Figure 2 I have illustrated my improved teat engaging tip in connection with a filter pump in which the tapered sides 11 merge into the face 19 which forms one end of a tube 19$^A$. Into this tube is placed a cartridge 22 containing a filtering medium 23. The member 22 is a loose fit in the tube 19$^A$ to facilitate replacements. The ends 24 and 24$^A$ are provided with holes 25. A pump cylinder 21 is screwed into the member 19$^A$ which is provided with internal threads 20. The usual cup-leather plunger 26, plunger rod 27 and handle 28 are used.

The operation of my device is as follows: When it is desired to force any liquid or gaseous matter into an udder, the operator places the countersunk portion 16 of the teat engaging tip over the passage 18 in the teat 17 and applies pressure through the hose 14 in the most convenient manner, whether it be with a spray-pump or any other means which will accomplish the purpose. His judgment tells him when sufficient matter has been injected into the udder.

When either pure or filtered air is to be used, the filter pump is best employed since the air in the locality where the animal is kept may not be sufficiently pure for the purpose. When it is desired to use medicated air it requires one to place the medicine on the cotton 23 where it will be taken up by the passing air.

It will be understood that I do not pretend to be the original user of pressure in the treatment of udders, but I wish to point out that the devices now in use for the purpose are very apt to bring about complications more serious than the one they were intended to relieve. This includes abrasions, infections, etc. The common milking tube is now in common use for this purpose.

The end 24$^A$ is curved to prevent the fine particles of filter material from closing the hole 15.

What I claim as new is:

A teat-engaging tip having a body; a stop flange formed around said body; a circular V-shaped wall formed on said flange on its teat engaging side and having a central opening passing through said body; and means for attaching a hose to said body.

MURRAY V. C. HOWES.